United States Patent
Hansen

(10) Patent No.: US 7,739,485 B2
(45) Date of Patent: Jun. 15, 2010

(54) CACHED FIELD REPLACEABLE UNIT EEPROM DATA

(75) Inventor: Peter A. Hansen, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1923 days.

(21) Appl. No.: 10/269,195

(22) Filed: Oct. 11, 2002

(65) Prior Publication Data

US 2004/0073816 A1 Apr. 15, 2004

(51) Int. Cl.
*G06F 1/26* (2006.01)
*G06F 12/00* (2006.01)

(52) U.S. Cl. .................... 713/1; 713/300; 711/103; 711/119; 711/120; 711/121

(58) Field of Classification Search ............... 713/1, 713/300; 711/103, 119–121
See application file for complete search history.

(56) References Cited

U.S. PATENT DOCUMENTS

| | | | |
|---|---|---|---|
| 5,216,579 A | 6/1993 | Basara et al. | |
| 5,598,536 A | 1/1997 | Slaughter, III et al. | |
| 5,854,904 A | 12/1998 | Brown | |
| 5,929,982 A * | 7/1999 | Anderson | 356/73.1 |
| 6,144,561 A | 11/2000 | Cannella, Jr. et al. | |
| 6,225,708 B1 | 5/2001 | Furukawa et al. | |
| 6,483,204 B2 | 11/2002 | Hanaki | |
| 6,594,771 B1 | 7/2003 | Koerber et al. | |
| 6,785,827 B2 | 8/2004 | Layton et al. | |
| 7,043,647 B2 | 5/2006 | Hansen et al. | |
| 7,138,733 B2 | 11/2006 | Sanders et al. | |
| 2002/0138785 A1* | 9/2002 | Hammond et al. | 714/14 |
| 2003/0005339 A1* | 1/2003 | Cohen et al. | 713/300 |
| 2003/0023885 A1 | 1/2003 | Potter et al. | |
| 2003/0030988 A1* | 2/2003 | Garnett et al. | 361/724 |
| 2003/0037150 A1 | 2/2003 | Nakagawa | |
| 2003/0056125 A1 | 3/2003 | O'Conner et al. | |
| 2003/0065730 A1* | 4/2003 | Jones et al. | 709/208 |
| 2003/0065754 A1* | 4/2003 | Jones et al. | 709/221 |
| 2003/0065958 A1* | 4/2003 | Hansen et al. | 713/300 |
| 2003/0112582 A1 | 6/2003 | Sanders et al. | |
| 2003/0208656 A1* | 11/2003 | Hawkins | 711/103 |

(Continued)

OTHER PUBLICATIONS

Hansen et al., Office Action dated Aug. 9, 2005, U.S. Appl. No. 09/966,180, filed Sep. 28, 2001, 9 pp.

(Continued)

*Primary Examiner*—Thomas Lee
*Assistant Examiner*—Fahmida Rahman

(57) ABSTRACT

A rack mounted computer system comprises a plurality of hot replaceable servers and power supplies that are mounted in chassis and assemblies which are coupled together and in which component specific data is stored in cache memory. The cache memory preferably is implemented on a communication module contained in each chassis/assembly. Some, or all, of the rack mounted components include ROM which contains component specific data. Such data includes one or more values specific to that component. The data may include any or all of the following: serial number, part name, manufacturing information, reorder information and physical dimensions of the associated component. By storing the component specific data in cache, less traffic is necessary on the rack's inter-chassis/assembly communication link(s) the chassis/assembly communication module snoops its cache and, if the data present in cache, provides the requested data from cache to the component.

18 Claims, 6 Drawing Sheets

U.S. PATENT DOCUMENTS

2003/0217067 A1* 11/2003 Gilstrap et al. .............. 707/100
2004/0073816 A1 4/2004 Hansen

OTHER PUBLICATIONS

Hansen et al., Response to Ofice Action dated Aug. 9, 2005, filed Oct. 12, 2005, 26 pp. U.S. Appl. No. 09/966,180, filed Sep. 28, 2001, 9 pp.
Sanders et al., Office Action dated Aug. 8, 2005, U.S. Appl. No. 10/017,785, filed Dec. 13, 2001, 9 pp.
Sanders et al., Response to Office Action dated Aug. 8, 2005, filed Oct. 27, 2005, 24 pp. U.S. Appl. No. 10/017,785, filed Dec. 13, 2001.
Sanders et al., Office Action dated Jan. 12, 2006, U.S. Appl. No. 10/017,785, filed Dec. 13, 2001, 17 pp.
Sanders et al., Response to Office Action dated Jan. 12, 2006, filed Apr. 12, 2006, 81 pp., U.S. Appl. No. 10/017,785, filed Dec. 13, 2001, 17 pp.

* cited by examiner

CACHED FIELD REPLACEABLE UNIT EEPROM DATA

CROSS-REFERENCE TO RELATED APPLICATIONS

This application is related to application Ser. No. 09/966,180, issued as U.S. Pat. No. 7,043,647, entitled "Intelligent Power Management for a Rack of Servers," filed Sep. 29, 2001 and incorporated herein by reference. This application is also related to application Ser. No. 10/017,785, issued as U.S. Pat. No. 7,138,733, entitled "Redundant Data and Power Infrastructure for Modular Server Components in a Rack," filed Dec. 31, 2001 and also incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to improved usage of a shared bus. More particularly, the preferred embodiments of the present invention relate to using cache memory to store ROM-based data usable by various computers and computer-related devices in a rack-mounted server system.

2. Background of the Invention

Many organizations have a computer network to provide their computing needs. A typical network includes two or more computers and computer-related devices (e.g., printers, storage devices, etc.) coupled together. Often, the organization's network may comprise numerous server computers coupled together. Generally, each server is loaded with an operating system and one or more applications that cause the server to perform various predetermined functions. An example of such a function includes responding to web page requests from a remote entity on the Internet. In response, the server may retrieve the requested web page and provide the requested page to the requesting entity. Further, all of the servers in the network may perform the same function thereby permitting the network to handle a large volume of traffic. The preceding example is provided simply to explain that groups of servers are often coupled together into a network, and should not be interpreted as in any way limiting the scope of this disclosure.

At least one server provider, Hewlett-Packard Corporation, provides server systems in rack form. That is, a plurality of servers and related devices (e.g., storage device, network ports, etc.) are individually mounted in a rack that can accommodate dozens of servers. Further, to maximize the number of servers that can be installed into the rack, each server preferably is made as small as possible. To that end, the servers do not include a display or keyboard. Rather, a user can interact with an individual server via a single display and input device (e.g., keyboard, mouse, etc.) combination that can be electrically coupled to any of the servers in the rack. Further, each server may not have an alternating current ("AC")-to-direct current ("DC") power supply. Instead, a separate AC-to-DC power supply is provided in the rack apart from, but coupled to, the servers. Multiple power supplies may be needed to accommodate the power demand for all of the servers and other devices in the rack. In this configuration, the power supply converts incoming AC voltage to DC voltage and provides DC voltage(s) to each server. The servers may include DC-to-DC converters to convert the incoming DC voltage from the power supply to a different DC voltage level as needed. The servers do not include the circuitry necessary to convert AC voltage to DC voltage and thus are smaller than they would be if they included AC-to-DC power supplies.

Moreover, a rack implementation such as that described above includes multiple servers coupled together and to other computer-related devices (e.g., storage devices) and to one or more power supplies. Many of Hewlett-Packard's server systems include the ability to install and remove any rack component (server, power supply, storage device) independent of the other components. In fact, many or all components can be installed and removed without powering down the rack (referred to as "hot plugging"). Thus, a server that has malfunctioned can be removed and replaced with a new server without having to turn off the other servers in the rack.

In systems such as that described above, each removable component preferably includes a field replaceable unit ("FRU") data set stored in non-volatile memory in the component. The FRU data for each replaceable unit may include one or more parameters such as serial number, part name, manufacturing information, reorder information and physical dimensions. The FRU data may be stored in an electrically erasable programmable read only memory ("EEPROM") and may be read by any other component in the rack. If a component in the rack malfunctions, an alert is sent out to the other components in the rack. In response, the other components may desire to read the failed component's FRU data so that the information ultimately can be provided to a network administrator and the defective component can be reordered and replaced.

A problem occurs as the number of components in the rack increases. In some rack systems, a relatively low speed management bus is included to interconnect the various components within the rack. Requests for FRU data and responses to such requests are routed over this management bus. If a component fails, all other rack components may send FRU data requests to the failed component over the low speed management bus. With a relatively few components in the rack, such a low volume of requests may be well within the capabilities of the management bus. However, as the number of components increases, the volume of FRU data requests may easily inundate the low speed management bus to the point where network performance is greatly reduced. Accordingly, a solution to this problem is needed.

BRIEF SUMMARY OF THE INVENTION

The problems noted above are solved in large part by a system that comprises a plurality of components, preferably hot replaceable, that are coupled together and in which component specific data is stored in cache memory. In one embodiment the components may comprise computers such as servers and power supplies. Some, or all, of the components include read only memory which contain component specific data. Such data includes one or more values specific to that component. In one embodiment, the data may include any or all of the following: serial number, part name, manufacturing information, reorder information and physical dimensions of the associated component.

The system also includes cache memory associated with the various components. The cache memory preferably is used to store the component specific data so that subsequent uses of the data are retrieved from cache and requests for the data need not be forwarded to the targeted component. In one embodiment, the system comprises a rack containing one or more removable chassis. Each chassis can accommodate one or more servers and includes a chassis communication module connected to the servers in that chassis. In this embodiment, the cache memory is provided on the chassis communication module. The system also includes one or more power supply assemblies that each includes one or more power supplies. Each power supply assembly preferably includes a power supply communication module which also includes cache memory.

In this embodiment, when one component, be it a server, power supply, or other component as may be included in the system, requests the component specific data for another component's ROM, the communication module in the chassis or assembly containing the requesting component snoops its cache to see if the requested data is stored therein. If it is, the data is retrieved from cache and provided to the requesting component. If the requested data is not stored in cache, a request is forwarded on to the chassis or assembly containing the requested data in the target component's ROM. Once retrieved from ROM, the data is provided to the requesting component and also stored in the cache of the requesting component's chassis or assembly. If desired, the requested data may be broadcast to all other chassis/assembly communication modules for storage in cache.

In accordance with one embodiment of the invention, a computer system comprises a first hot replaceable device and a second hot replaceable device coupled to the first device. The second device includes a ROM in which second device specific data is stored. The system also includes cache memory coupled to the first device in which the second device specific data is stored.

In accordance with another embodiment, the computer system comprises a plurality of servers with each server having ROM in which server specific data is stored. The system further includes a power supply which couples to and supplies power to the servers. The power supply includes ROM in which power supply specific data is stored. A first cache memory also is included which couples to the plurality of servers in which the power supply specific data is stored. A second cache memory is included which couples to the power supply in which server specific data of at least one server is stored.

In accordance with another embodiment, a computer system comprises a first component mounted in a rack and a second component mounted in a rack and coupled to the first component. The second component includes a ROM in which second component specific data is stored. A cache memory is coupled to the first component. When the first component requests the second component specific data, the second component provides the requested data to the first component and to the cache which stores the second component specific data therein.

The preferred embodiments also include a method of managing a rack containing a plurality of servers and power supplies, with server and power supply being hot replaceable and including ROM on which data specific to the associated server or power supply is stored. The method preferably includes (a) requesting the ROM data of a server or power supply, (b) retrieving the requested ROM data, (c) providing the requested ROM data to the requesting server or power supply, and (d) storing the requested ROM data in cache memory.

The aforementioned embodiments and others and their equivalents use cache memory to reduce amount of traffic on a communication link interconnecting various components in the system. This and other benefits will become apparent upon reviewing the following description.

BRIEF DESCRIPTION OF THE DRAWINGS

For a detailed description of the preferred embodiments of the invention, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "hot replaceable" refers to a device that can be installed into and/or removed from a system while other components in the system remained powered.

Certain terms are used throughout the following description and claims to refer to particular system components. As one skilled in the art will appreciate, computer companies may refer to a component by different names. This document does not intend to distinguish between components that differ in name but not function.

DETAILED DESCRIPTION OF THE PREFERRED EMBODIMENTS

Figure 1:
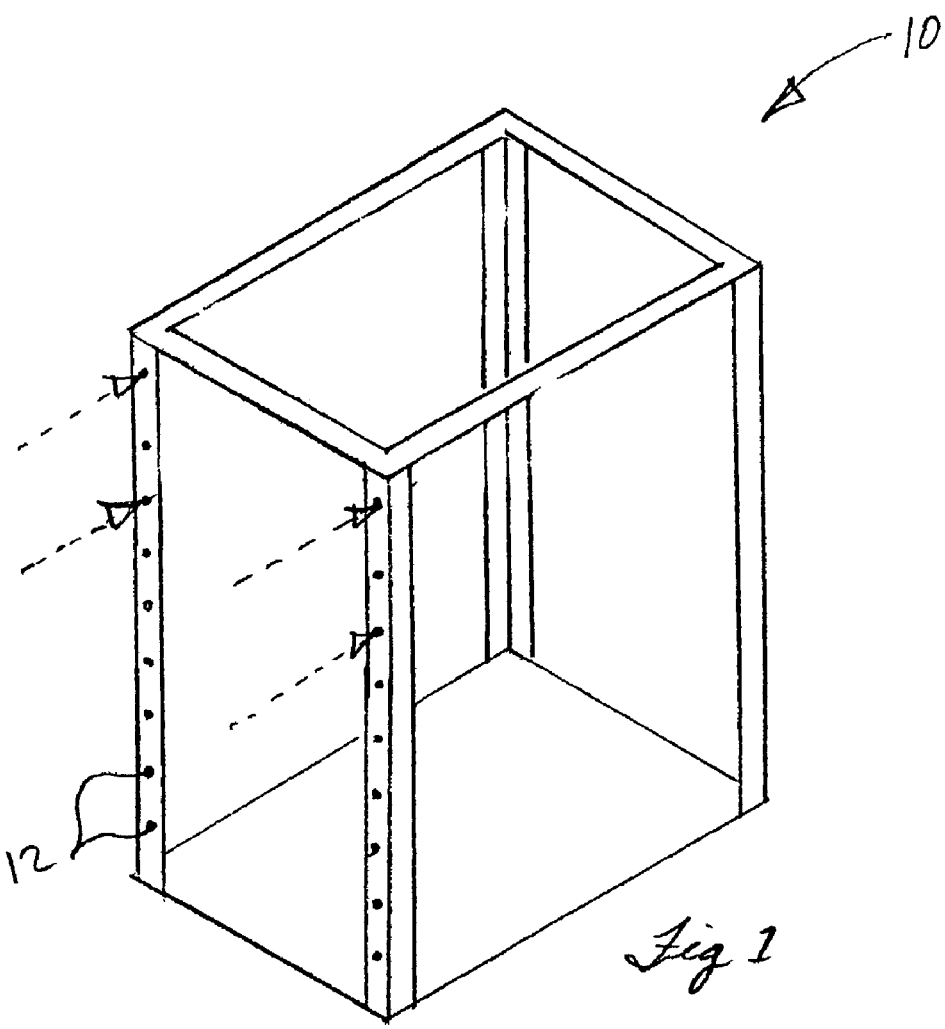
FIG. 1 shows a perspective view of a rack for a rack mounted server system.

FIG. 1 shows a rack 10 usable in a rack mounted server system. The rack 10 preferably comprises a plurality of structural members which form the frame of the rack mounted system. A plurality of threaded holes 12 are provided on a front portion of the rack 10. The threaded holes 12 are adapted to hold various devices within the rack 10. The rack could be as simple as a top, a bottom and four corner pieces forming the structure, but may also include decorative or functional coverings around and on those structural components.

Figure 2:
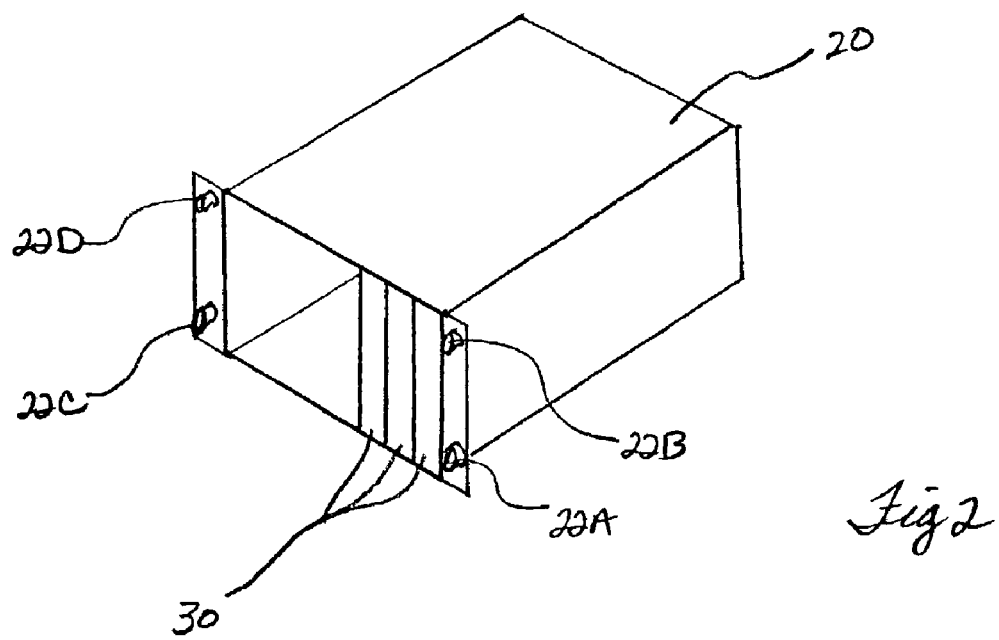
FIG. 2 shows a perspective view of a chassis adapted to be inserted into the rack of FIG. 1.

FIG. 2 shows a chassis 20 which preferably is adapted to slide into the rack 10. In the preferred embodiments of the present invention, individual servers are mounted in the rack mounted system by insertion into the chassis structures. A chassis may alternatively be a port or an enclosure. The chassis preferably mounts at any one of a variety of locations in the rack 10 by use of knurled knobs 22A-D. These knurled knobs preferably have a threaded portion (not shown) which engage the threaded holes 12 of the rack 10. These knurled knobs 22A-D and/or many other retention devices familiar to one of ordinary skill in the art, hold the chassis 20 within the rack 10. Each chassis 20 of the preferred embodiment is constructed such that a plurality of servers may be installed therein. While only three such servers are shown in FIG. 2, in the preferred embodiment each chassis 20 is adapted to hold eight servers 30. Referring still to FIG. 2, the chassis 20 is preferably adapted to hold one or more servers 30 in a vertical position as shown. Further, as explained below each chassis 20 also is adapted to hold one or more communication modules which couple to the servers 30 and permit the servers to communicate with each other and to systems and devices outside the chassis, such as in other chassis within the rack system.

Figure 3:
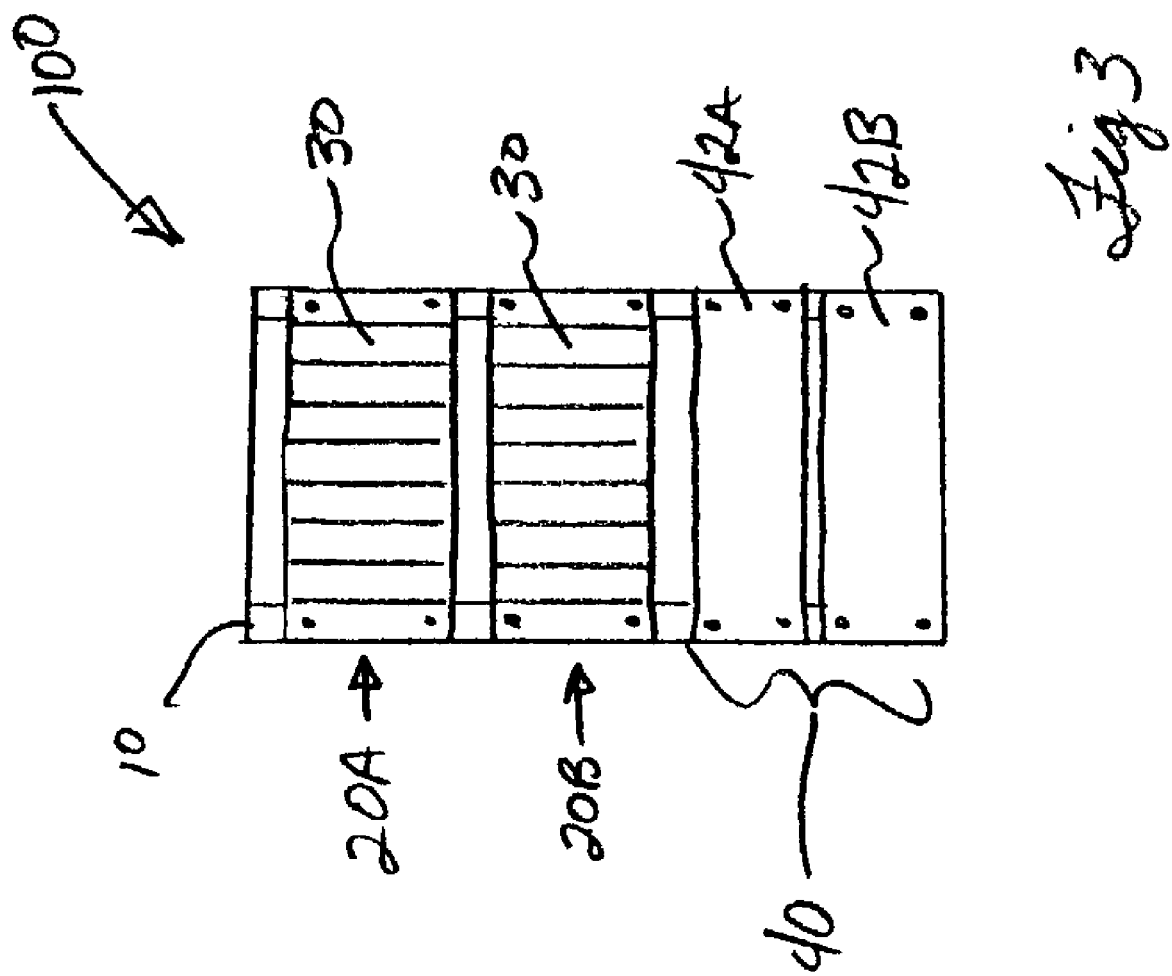
FIG. 3 shows a front elevational view of a rack mounted server system having two chassis and two power supply assemblies.

FIG. 3 shows a front view of an exemplary rack mounted server system 100 of the preferred embodiment. In particular, FIG. 3 shows two chassis 20A and 20B mounted within the rack 10. Each chassis preferably houses a plurality of servers 30. While any number of chassis 20 may be used in the server system 100, the preferred embodiment includes at least one, and preferably no more than six chassis 20 in any one system.

To minimize the size of each server 30 so as to maximize the number of servers in each chassis 20, preferably none of these servers 30 contain on-board AC to DC power supplies. Rather, and still referring to FIG. 3, direct current ("DC") power is supplied for each server 30 in the server system 100 from a power supply system 40. In the preferred embodiment of FIG. 3, the power supply system 40 comprises two power supply assemblies 42A, B. The number of power supply assemblies 42 required for any particular server system 100 will depend on the number of chassis 20, the number of servers 30 within those chassis, and the power demand of each server. For a server system 100 having six chassis 20 with each chassis housing eight servers 30, preferably two power supply assemblies 42A, B are used. If more server chassis and servers are added, more power supply assemblies 42 may be required. Likewise, if fewer servers are used, it is possible that the power supply system 40 may include only a single power supply assembly 42.

Figure 4:
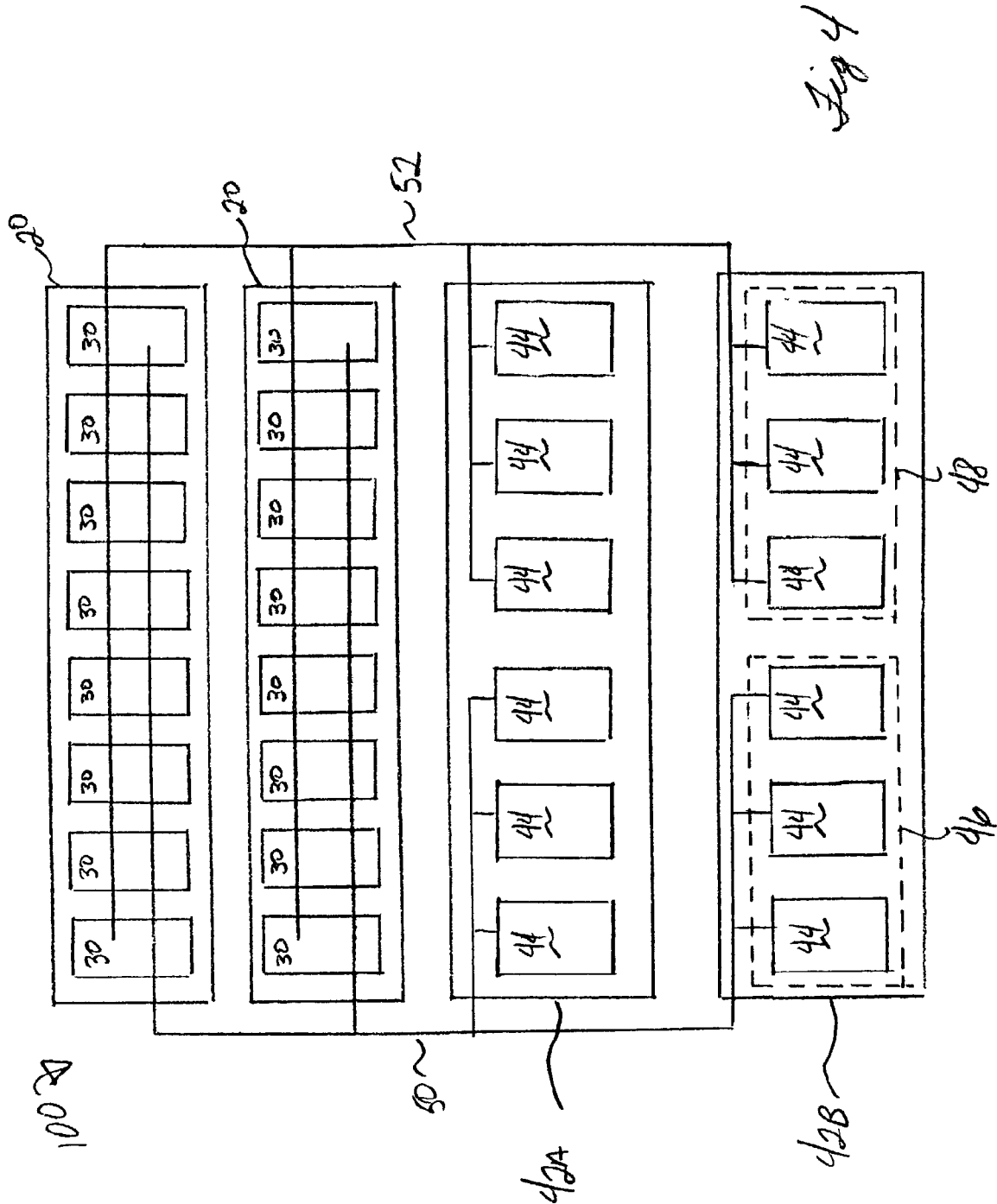
FIG. 4 shows an electrical block diagram of power distribution in the server system of the preferred embodiment.

The following discussion describes the basic electrical connectivity and communication of the system 100. Then, the use of the system 100 to solve the problems noted above will be described. FIG. 4 shows an electrical schematic for power distribution in a server system 100 of the preferred embodiment. Preferably, each power supply assembly 42 comprises a plurality of individual power supplies 44, and in the preferred embodiment each power supply assembly 42 may have six such individual power supplies 44. Preferably, the individual power supplies 44 within a power supply assembly 42 are divided into two banks 46 and 48 (the banks 46 and 48 are shown only on power supply assembly 42B, but are equally applicable to all power supply assemblies). The individual power supplies 44 in each bank 46, 48 then place their power on respective DC power supply rails 50 and 52.

In the rack mounted server system 100 of the preferred embodiment, the power supply rails 50, 52 are fully redundant supplies to the servers 30 in the chassis 20. In other words, the bank 46 of the power supply assemblies 42 that feed a particular rail are preferably capable of supplying all the necessary power to operate the server system 100. Likewise, the second bank 48 of the power supply assemblies 42 are also preferably adapted to supply all the necessary power to operate the entire server system 100. In this way, the power supplies may be operated in a fully redundant fashion. The schematic of FIG. 4 indicates this ability by showing that each server 30 is coupled to each power rail 50, 52. Thus, in accordance with the preferred embodiments, each set of servers 30 in each chassis 20 are preferably adapted to have the capability to take their full required operational power from either rail, thus implementing the full power supply redundancy of the preferred embodiment. FIG. 4, however, does not indicate any ability for the servers 30 to communicate with the power supply system 40 shown in FIG. 3 and depicted in FIG. 5 as comprising power supply assemblies 42A and 428. Although it may be possible to operate a server system that has little or no communication between the power supply system in the servers themselves, the preferred embodiments of the present invention implements an intelligent allocation and de-allocation of power. This intelligent allocation and de-allocation includes some form of communication between the power supply system and the computers or servers. Copending applications Ser. Nos. 09/966,180 and 10/017,785, both of which are incorporated herein by reference, detail the power management process.

Figure 5:
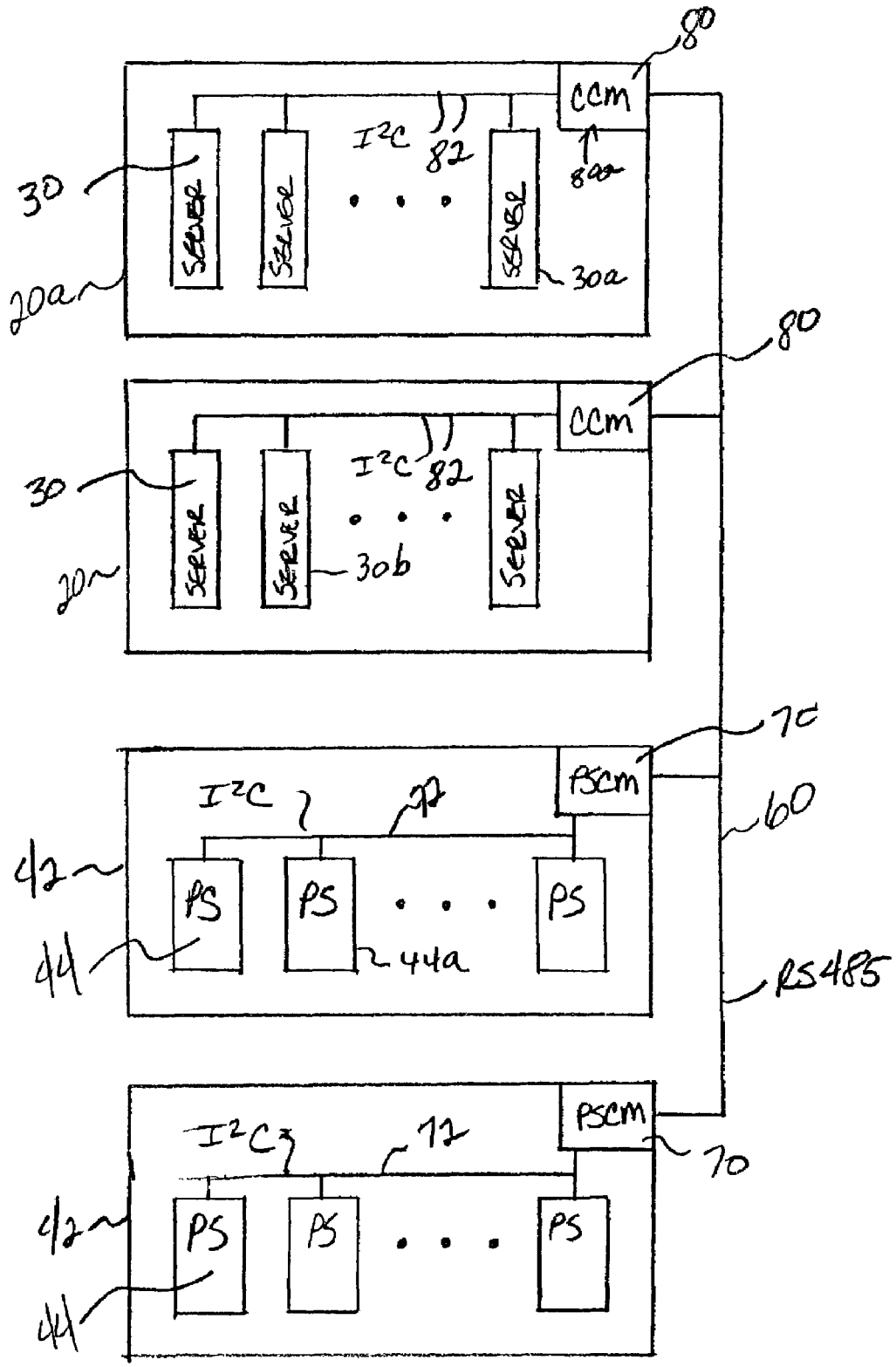
FIG. 5 shows an electrical block diagram of a power management system for the server system of the preferred embodiment.

FIG. 5 shows the preferred implementation of a power management system for a rack mounted server system, which allows the various chassis 20 to communicate with each other and with the power supply assemblies 42. In particular, the preferred embodiment implements a serial communication pathway 60 coupling each of the power supply assemblies 42 and each chassis 20. This serial communication pathway 60 preferably comprises an Institute of Electrical and Electronic Engineers ("IEEE") RS-485 compliant system. However, while the RS-485 system is preferred, communication between the power supply assemblies 42 and the servers 30 within the chassis 20 may take place by any suitable serial or parallel common communication bus and protocol. Although it may be possible to have each server 30 and each power supply 44 in the server system communicate over the serial communication pathway 60, this may be impractical in some situations. In the preferred embodiment there may be up to six chassis 20, each housing eight servers 30. Thus, there may be as many as forty-eight individual servers 30 in the system. Further, the preferred embodiment may comprise as many as two power supply assemblies 42, each having as many as six individual power supplies 44 for a total of twelve individual power supplies 44. In such a system, allowing each individual device 30, 44 to communicate on the serial communication pathway 60, as many as sixty individual devices would be vying for and arbitrating for the ability to communicate thereon. Additional problems would ensue in such a system In designating a particular primary or other device to make decisions regarding allocation and de-allocation of power. Thus, although the scope of this disclosure includes each individual device 30, 44 communicating directly on the RS-485 pathway 60, a different intra-rack communication architecture is preferred.

Rather than allowing each individual server 30 and power supply 44 to communicate on the serial communication pathway 60, the preferred embodiment implements a plurality of communication modules which interface the various servers and power supply devices in the server chassis 20 and power supply assemblies 42 to the RS-485 communication pathway 60 and thus to other chassis 20 and assemblies 42. In particular, and still referring to FIG. 5, each of the power system assemblies 42 and each of the chassis 20 preferably have a communication module that is responsible for relaying messages to the serial communication pathway 60. More particularly still, each power system assembly 42 preferably includes a power supply communication module 70 ("PSCM") while each server chassis 20 includes a chassis communication module ("CCM") 80.

In the preferred embodiment, each power system communication module 70 is mounted on or near a backplane board of each respective power system assembly 42. In broad terms, a power supply communication module 70 is responsible for communicating with each individual power supply 44 in its respective power supply assembly 42 to determine parameters of each individual power supply 44 such as fan operability, the internal temperature of the power supply, the power supply input power (incoming AC power), and output current. In the preferred embodiment, the power supply communication module 70 also is preferably capable of communication across the serial communication pathway 60 to other power supply communication modules and other chassis communication modules 80. Each power supply communication module 70 communicates with the individual power supplies 44 in the particular power system assembly 42 by means of an I²C bus 72. As is well known, the I²C bus is a dual line, multidrop serial bus developed by Philips Semiconductors that comprises a clock line and one data line. The devices connected to the I²C bus can act as either primary or secondary devices (or alternatively master or slave respectively), and each device is software addressable by a unique address. Primary devices can operate as transmitters, receivers, or combination transmitter/receivers to initiate 8-bit data transfers between devices on the bus. The I²C utilizes arbitration to prevent data corruption when two or more master or primary devices desire simultaneously transfer data. Details regarding the I²C bus may be found in "The I²C-Bus Specification," Version 2.1 (January 2000), authored by Philips Semiconductors®. Although the I²C bus is used to implement the preferred communication pathway 60 between the individual power supplies 44 and the power supply communication module 70, any serial or parallel communication protocol could be used.

Still referring to FIG. 5, much like the power supply assemblies 42, each chassis 20 preferably includes a chassis communication module 80 ("CCM"). The chassis communication module 80 preferably communicates with each server 30 within its particular chassis 20, and preferably relays messages as necessary to and from the serial communication pathway 60. The chassis communication module 80 is not only adapted to communicate using the preferred RS-485 protocol of the serial communication pathway 60, but also preferably communicates to each individual server 30 within its chassis 20 by means of an I²C serial communication pathway 82. While the I²C communication pathway 82 is preferred, any suitable communication system and protocol may be used to facilitate the communication.

Figure 6:
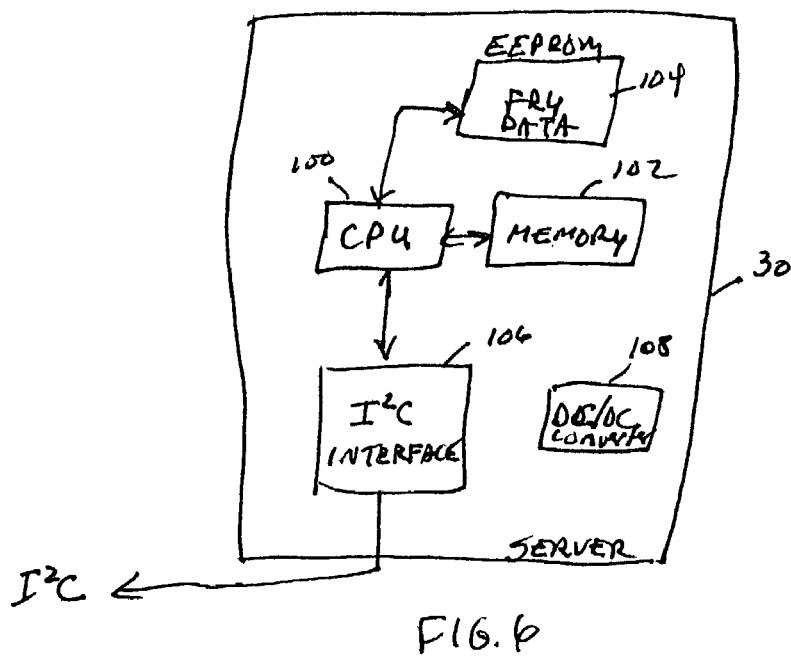
FIG. 6 shows an electrical block diagram of a server 30.

FIG. 6 shows a partial electrical block diagram of a server 30. The server is preferably a computer system having one or more central processing units ("CPUs") 100, random access memory ("RAM") 102, an electrically erasable programmable read only memory ("EEPROM") 104, an I²C interface 106, and other devices required for normal computer system operation, but the server 30 preferably does not include a power supply for converting AC power to DC power. However, the server 30 preferably does include a DC-DC converter 108 to convert the preferred voltage supplied from the power supply system 40 to the required operational voltage(s) for the CPU 100 and other server components.

As noted above with regard to FIG. 6, each server 30 includes an EEPROM 104. Preferably, the EEPROM 104 in each server contains FRU data specific to that component (server) as explained previously. The FRU data may include one or more parameters such as serial number, part name, manufacturing information, reorder information and physical dimensions. Additional and/or different information may be included as part of the server's FRU data. In general, each server's FRU data is accessible via the I²C interface 106.

Referring briefly to FIG. 5, a component in one chassis 20 or assembly 42 can request the FRU data pertaining to a server in a different chassis via the RS-485 communication pathway 60 and communication module 70, 80 which translates the request into an I²C-compliant message to the targeted server. The requested FRU data then can be retrieved and provided over the I²C bus 82 to the corresponding communication module 80 and then to the RS-485 communication pathway 60 and ultimately to the requesting component.

Figure 7:
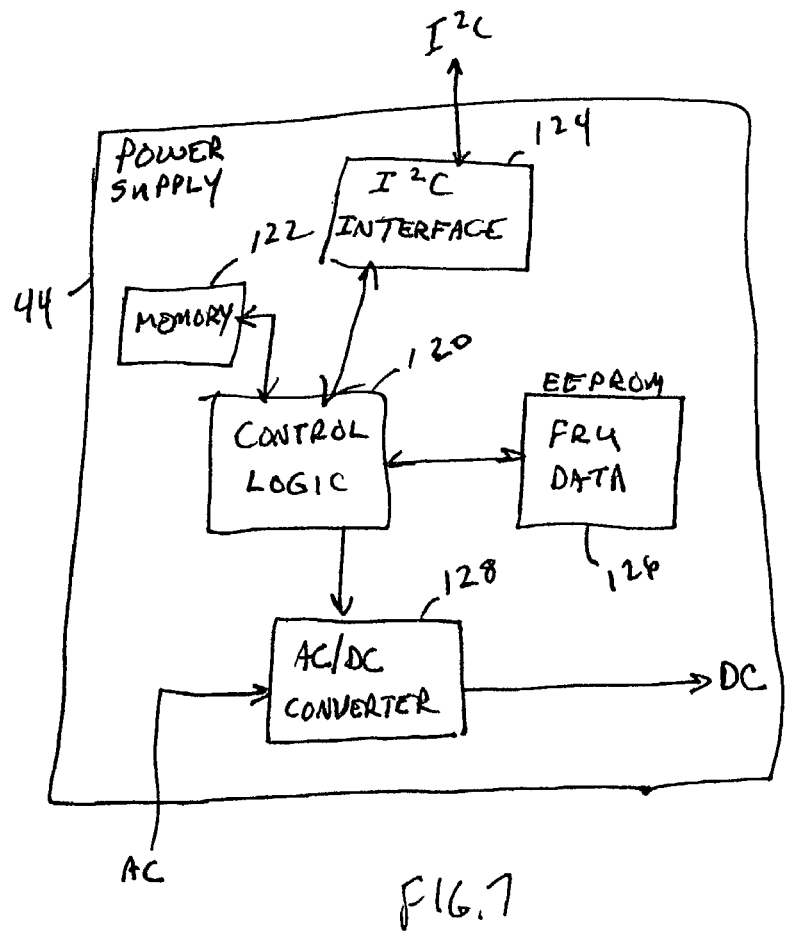
FIG. 7 shows an electrical block diagram of an individual power supply.

FIG. 7 shows a partial electrical block diagram of an individual power supply 44. As shown, the power supply 44 includes control logic 120 coupled to memory 122, an I²C interface 124, an EEPROM 126 and AC-to-DC converter 128. Under control by control logic 120 (which may be a CPU or other type of control logic), the AC-to-DC converter 128 converts incoming AC voltage to a desired DC voltage level to provide to other components in the rack. The power supply 44 communicates to the PSCM 70 in its assembly 42 via the I²C interface 124. Further, FRU data pertaining to the power supply 44 is stored in the EEPROM 126. The FRU data may be of the same general nature as the server FRU data described above. As for the servers, the power supplies FRU data can be accessed by other components in the assembly 42 via the I²C interface or by components in other parts of the rack via the RS-485 communication pathway 60, PSCM 70, and I²C interface 124.

Figure 8:
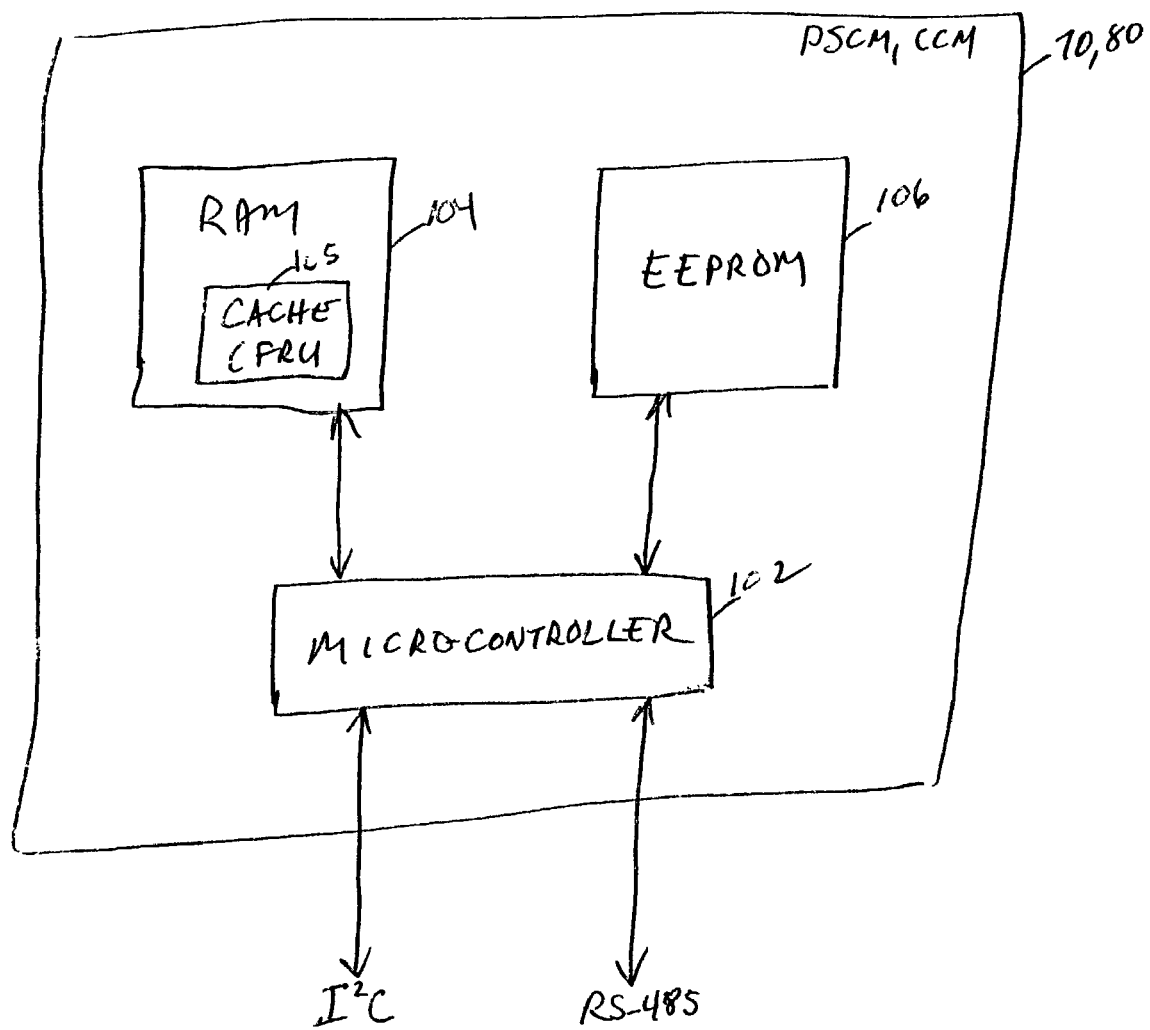
FIG. 8 shows an electrical block diagram of a power supply communication module or a chassis communication module of the preferred embodiment.

FIG. 8 shows a detailed electrical block diagram usable for both the power supply communication module 70 and the chassis communication module 80 in accordance with the preferred embodiment. In particular, the communication modules 70, 80 comprise a microcontroller 102, which may comprise a part No. ZIRCON-LH2 manufactured by Qlogic Corporation, RAM 104, and an EEPROM 106. The EEPROM 106 is usable for storing programs and other data for use by the microcontroller 102. Preferably, each of the chassis communication modules 70 and 80 are substantially the same, but may be implemented with different functionality, if desired. In general, the communication modules 70, 80 are capable of communicating over an I²C bus to replaceable components associated with the communication module (as shown in FIG. 5) and over an RS-485 communication pathway 60 to other communication modules in the rack.

The problem explained previously in which the low speed communication pathway 60 can be inundated with an excessive amount of FRU request messages is alleviated by implementing "cache" memory in which the FRU data can be stored. Then, when the various components in the rack desire the FRU data, the cache infrastructure retrieves the requested FRU data from the cache memory instead of forwarding the request to the particular component whose FRU data is being requested.

In accordance with a preferred embodiment of the invention, and referring to FIGS. 5-8, at least a portion of memory 104 in each communication module 70, 80 preferably is allocated for use as cache memory 105 (FIG. 8). This cache 105 can be used to store FRU data corresponding to any component in the rack that includes FRU data. Referring to FIG. 5, server 30a may request the FRU data corresponding to power supply 44a. This request and its corresponding response traverse the RS-485 communication pathway 60 between server and power supply. In addition to providing the requested FRU data over the I²C link 82 to the requesting server 30a, a copy of the requested FRU data preferably also is copied into the CCM 80a's cache memory 105. Then, when the same or different server in the chassis 20a requests the same FRU data, the request causes the CCM 80a to "snoop" its cache 105, determine that the requested FRU data is present in the cache and provide the requested FRU data to the requesting entity, instead of forwarding the request over the RS-485 communication pathway 60 to the targeted power supply 44a. The preferred embodiment thus implements inter-chassis, trans-rack cache memory to avoid bottlenecks on the low speed management bus 60.

If desired, the FRU data from power supply 44a may be provided back to, not only CCM 80a, but all CCM 80s and PSCM 70s in the rack system. Thus, the cache memories in all communication modules 70, 80 may be loaded with an FRU data block. A broadcast response message can be implemented to broadcast the requested FRU data to all PSCMs 70 and CCMs 80. In this way, even if a component in a different chassis than that of server 30a, such as server 30b, requests the FRU data from power supply 44a, the FRU data request from such a component is intercepted by its associated communication module which snoops its own cache memory 105 and provides the requested FRU data. The FRU data request need not be forwarded onto the RS-485 communication pathway 60, thereby further reducing the traffic on management bus 60

Referring again to FIG. 8, the cache memory 105 preferably includes a plurality of entries. Each entry may contain the FRU data for one, and possibly more than one, system component (e.g., server, power supply). The cache 105 may contain sufficient storage to accommodate the FRU for all of the components in the system, or only some of the system components. Each communication module 70, 80 includes cache memory 105 that preferably is controlled by microcontroller 102 or separate logic. The logic that controls the cache, be it microcontroller 102 or other logic, is capable of writing data to cache 105, reading data from cache 105, snooping the cache to determine if a requested piece of data is already stored in the cache (referred to as a cache "hit" when the data is in cache and a cache "miss" when the requested data is not in the cache). The ability to snoop the cache to detect hit or miss conditions, retrieve the requested data from the cache, write new data to the cache, etc. are well-known techniques to those of ordinary skill in the art. Such techniques typically implement cache "tags" to assist in determining cache hits and misses.

Using the system described herein, a problem will occur if a system component (e.g., server, power supply, etc.) whose FRU data has been stored in the cache memory of the various communication modules 70, 80 is disabled and/or is physically removed from the system. In this case, the component (and its FRU data) is no longer present in the system, but copies of its FRU data are still stored in the various cache memories 105 (FIG. 8). For purposes of this disclosure, this problem is referred to as "data mismatch."

In accordance with the preferred embodiment, this data mismatch problem is solved by broadcasting an alert message pertaining to the component that is about to be disabled and/or removed from the system to at least one, and preferably all, of the communication modules 70, 80 in the system. The component to be disabled/removed may broadcast the alert message, or other logic in the system. The alert message includes the identity (e.g., address, serial number, etc.) of the component to be disabled and/or removed. Each communication module 70, 80 receiving the alert message determines whether it has a cache entry corresponding to the component to be disabled or removed. If the communication module does have such an entry in its cache, then the communication module discards that entry. The discarding process may include invalidating the targeted cache block or otherwise identifying the data at the cache entry as being unusable and free to be evicted for subsequent replacement by a new FRU cache block.

The preferred embodiments described herein minimize the potential for the inter-chassis communication pathway to become overly congested with traffic, particularly traffic that includes a plurality of requests for the same piece of data (e.g., FRU data of a system component). The problem is solved by providing cache memory in which the requested data is stored. Thus, subsequent accesses to the same piece of data advantageously result in a cache "hit" and avoid the need to use the inter-chassis communication pathway.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a plurality of hot replaceable devices coupled to one another via a plurality of chassis communication modules, said plurality of hot replaceable devices comprising at least a first hot replaceable device and a second hot replaceable device, and each of said plurality of chassis communication modules comprising a cache memory; and
said second hot replaceable device includes a read only memory ("ROM") in which second device specific data is stored;
wherein said second hot replaceable device receives a request from said first hot replaceable device for said second device specific data, said second hot replaceable device broadcasts said requested second device specific data to at least one of said plurality of chassis communication modules, and said second device specific data is stored within the cache memory corresponding to each of the at least one of said plurality of chassis communication modules; and
wherein at least one of said plurality of chassis communication modules receives subsequent requests from said first hot replaceable device for said second device specific data, retrieves said second device specific data from the corresponding cache memory, and transmits said second device data to the first hot replaceable device.

2. The computer system of claim 1 wherein said first hot replaceable device comprises a server.

3. The computer system of claim 1 wherein said second hot replaceable device comprises a power supply.

4. The computer system of claim 1 wherein said first hot replaceable device comprises a server and said second hot replaceable device comprises a power supply.

5. The computer system of claim 1 wherein said second device specific data includes a serial number of said second device.

6. The computer system of claim 1 wherein said second device specific data includes a part number of said second device.

7. The computer system of claim 1 wherein said second device specific data includes at least one value pertaining to said second device selected from the group consisting of serial number, part number, manufacturing information, reorder information, and physical dimension of said second device.

8. The computer system of claim 1 wherein upon disabling said second device, an alert message is sent to the cache memory corresponding to the at least one of said plurality of chassis communication modules, and wherein the alert message invalidates the second device specific data contained therein.

9. A computer system, comprising:
- a plurality of servers, each server having ROM in which server specific data is stored;
- a plurality of chassis, each chassis including one or more of the plurality of servers and including a chassis communication module containing a memory accessible to the servers of that chassis;
- a power supply which couples to and supplies power to said servers, said power supply includes ROM in which power supply specific data is stored;
- a first cache memory within the memory coupled to said plurality of servers in which said power supply specific data is stored; and
- a second cache memory within the memory coupled to said power supply in which server specific data of at least one server is stored;
- wherein a request by a server of said plurality of servers for the power supply specific data causes said power supply to broadcast the requested data to a plurality of said chassis communication modules; and
- wherein, once stored in the first cache memory, said server requests said cached power supply specific data and said requested data is retrieved from cache and provided to said server requesting the data.

10. The computer system of claim 9 wherein said server specific data includes at least one value specific to the server selected from the group consisting of serial number, part number, manufacturing information, reorder information, and physical dimension of said server.

11. The computer system of claim 9 wherein said power supply specific data includes at least one value specific to the power supply selected from the group consisting of serial number, part number, manufacturing information, reorder information, and physical dimension of said power supply.

12. The computer system of claim 9 further including at least one additional power supply, each power supply having a ROM in which power supply specific data is stored.

13. The computer system of claim 9 wherein said one or more of the plurality of servers are mounted in a chassis and said chassis and said power supply mount in a rack, said chassis including a chassis communication module comprising said first cache memory accessible by all of the servers in said chassis.

14. The computer system of claim 13 wherein said chassis communication module couples to the power supply by way of a serial communication link.

15. The computer system of claim 9 further including a power supply communication module on which said second cache memory is provided, said power supply communication module coupled to said servers by way of a serial communication link.

16. The computer system of claim 9 wherein the chassis communication modules that receive the power supply specific data store the power supply specific data in their cache memories.

17. A method of managing a rack containing a plurality of servers and power supplies in communication with each other via a plurality of chassis communication modules, each server and power supply being hot replaceable and including ROM on which data specific to the associated server or power supply is stored, comprising:
 (a) a server of the plurality of servers requesting the ROM data of a power supply;
 (b) said power supply retrieving the requested ROM data;
 (c) said power supply broadcasting the requested ROM data to each of the plurality of chassis communication modules;
 (d) storing the requested ROM data in at least one cache memory;
 (e) a chassis communication module of the plurality of chassis communication modules retrieving the requested ROM data from the cache memory; and
 (f) the chassis communication module transmitting to the server the requested ROM data retrieved from the cache memory.

18. The method of claim 17 wherein each of the chassis communication modules includes a cache memory of the at least one cache memory and wherein storing the requested ROM data comprises storing the requested ROM data in each cache memory of the chassis communication modules.

* * * * *